April 6, 1937.     R. D. SMITH     2,076,325
SAFETY MECHANISM FOR RAILWAY CAR BRAKE RIGGINGS
Filed April 11, 1934
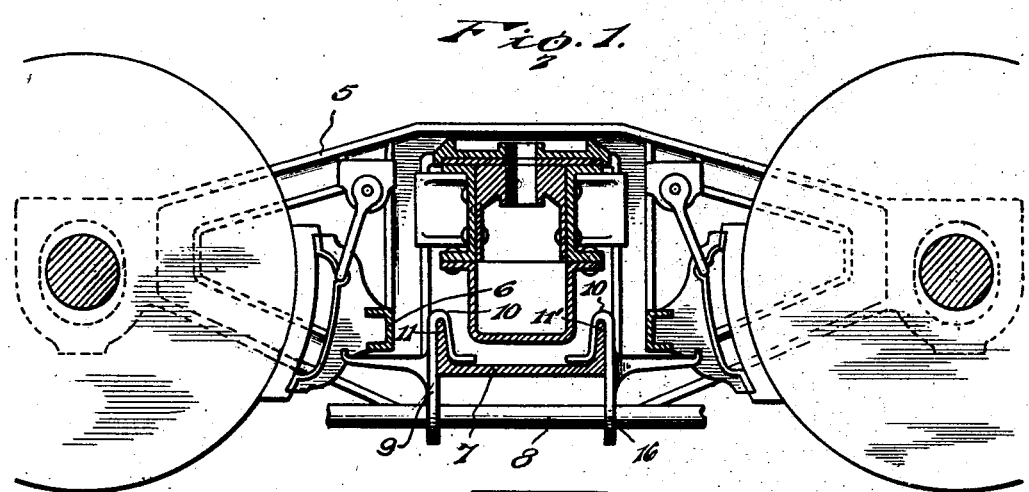
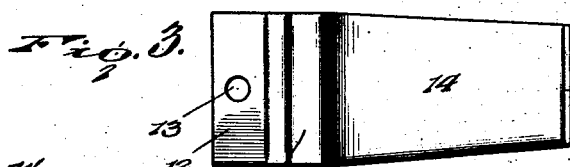
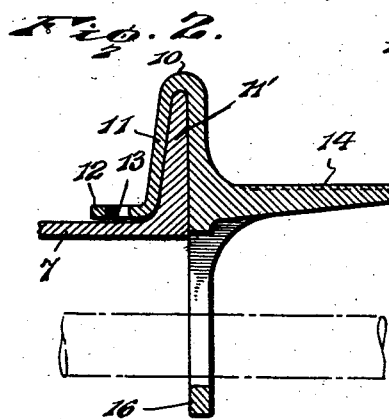
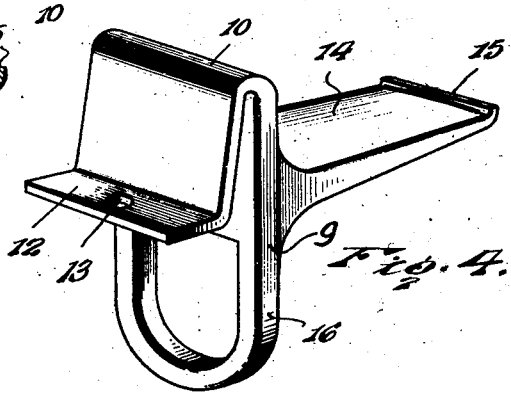
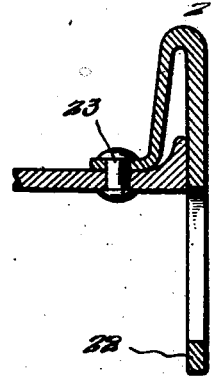
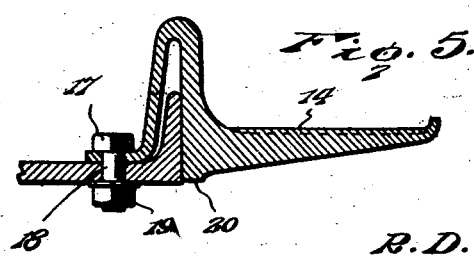
Inventor
R. D. Smith.
By Lacey & Lacey
Attorneys Patented Apr. 6, 1937

2,076,325

UNITED STATES PATENT OFFICE 2,076,325

SAFETY MECHANISM FOR RAILWAY CAR BRAKE RIGGINGS

Richard D. Smith, Andover, Va., assignor to Joseph L. Ortner, Cincinnati, Ohio

Application April 11, 1934, Serial No. 720,103

5 Claims. (Cl. 188—210)

This invention relates to safety mechanism for railway car brake rigging and has for its object to provide a comparatively simple and thoroughly efficient device of this character which will effectually prevent the brake beam and brake rod from falling on the track should either of said parts become broken or fail to function properly, thereby preventing serious accident which might otherwise occur.

A further object of the invention is to provide a safety device comprising a bracket or stirrup adapted to engage the spring board of a car truck and provided with a laterally projecting arm extending beneath the brake beam and a depending loop or stirrup for the reception of a brake rod.

A further object is to provide a safety device, the construction of which is such as to permit its adaptation to spring boards having different cross sectional formations and which, when in position thereon, will be securely held against accidental displacement.

A still further object of the invention is generally to improve this class of devices so as to increase their utility, durability and efficiency as well as to reduce the cost of manufacture.

In the accompanying drawing, forming a part of this invention, and in which similar numerals of reference indicate corresponding parts in all the figures of the drawing:

Figure 1 is a vertical sectional view of a railway car truck showing the safety device in position thereon.

Figure 2 is an enlarged detail vertical sectional view of one of the supporting brackets in position on the spring board of the truck.

Figure 3 is a top plan view of the bracket detached.

Figure 4 is a perspective view of the bracket.

Figure 5 is a vertical sectional view of a bracket with the rod-supporting hanger omitted and applied to a spring board of slightly different cross sectional formation.

Figure 6 is a similar view showing a bracket with the brake-beam-supporting arm omitted and applied to a spring board having a short relatively upstanding flange.

The improved safety device, forming the subject-matter of the present invention, is principally designed for application to railway car trucks and by way of illustration is shown in connection with a truck of standard construction in which 5 designates the frame, 6 the brake beams, 7 the spring board and 8 the brake rod which extends beneath the spring board in the usual manner. The device comprises a bracket 9, four of which are preferably used on each truck and arranged in pairs at opposite sides of the spring board 7. The brackets are preferably formed of metal and each comprises an inverted U-shaped portion 10, one leg of which diverges downwardly from the other to form a tapered recess 11 adapted to receive the correspondingly tapered upstanding flange 11' of the spring board 7. The inner or downwardly inclined leg of each bracket is bent laterally to form a flange 12 which extends substantially parallel with the upper surface of the spring board and is provided with an opening 13 which, in certain adaptations of the bracket, may receive a bolt or similar fastening device to assist in securing the bracket in position on the spring board. Projecting laterally from the outer or straight leg of the U-shaped portion 10 and molded or otherwise formed integral therewith is an arm 14 which tapers longitudinally in the direction of its free end and is provided with a terminal upstanding retaining lip 15. The upper surface of the arm 14 is preferably slightly convex and said arm extends beneath the brake beam 6 so as to receive and support the same should the latter for any reason break or fail to function properly and thereby prevent the brake beam from falling on the track and causing serious damage. Depending from the bracket and preferably disposed in vertical alinement with the outer straight leg of the U-shaped portion 10 is a suspension stirrup 16, preferably in the form of a loop, which serves to receive and support the brake rod 8 so as to prevent the brake rod from dropping on the track in the event that said brake rod should become broken or otherwise damaged. It should also be noted that as the stirrup is engaged about the rod 8 it will serve to brace the device against upward movement and thereby prevent the upper portion 10 thereof from moving upwardly to a position in which it may become dislodged from the flange of the spring board.

It will here be noted that owing to the angular disposition of the inner and outer legs of the U-shaped portion 10 of the bracket, the seating recess 11 is substantially wedge-shaped so that when the bracket is positioned on the flange 11' of the spring board, a clamping or wedging action will be exerted thereon thereby to securely hold the bracket on the spring board without the employment of bolts or similar fastening devices. If, however, the bracket should be jolted upwardly the stirrup will prevent it from moving upwardly a sufficient distance to become disengaged from the flange of the spring board. When the bracket is used on a spring board having a flange of less height than the flange shown in Figure 2 of the drawing, a bolt 17 is passed through the opening 13 and through a corresponding opening 18 in the spring board for engagement with a clamping nut 19 so as to assist in retaining the bracket in position, as best shown in Figure 5 of the drawing. In this form of the device, the loop or stirrup is omitted, the lower face 20 of the supporting arm being disposed substantially flush with the lower surface of the spring board. If desired, however, the bracket may be constructed with the supporting arm omitted and in which event the outer leg of the U-shaped loop will be extended downwardly to form a suspension loop or stirrup 22, as best shown in Figure 6 of the drawing. The flange of the spring board, shown in Figure 6 of the drawing, is relatively short and when the bracket is applied to such a spring board, it is preferred to rivet the bracket thereto, as indicated at 23, although a bolt and nut may be substituted for the rivet 23, if desired.

It will thus be seen that there is provided a comparatively simple and thoroughly efficient device which will effectually prevent a brake beam and brake rod from falling on the track should either of said parts become broken or fail to function properly, thereby preventing serious accident which might otherwise occur.

It will, of course, be understood that the brackets may be made in different sizes and shapes and constructed of any suitable material. It will also be understood that as many supporting brackets may be applied to the truck as may be found necessary to accomplish the desired result.

Having thus described the invention, I claim:

1. The combination with a car truck including a spring board, brake beam and brake rod, of a bracket engaging the spring board and provided with a laterally projecting arm extending beneath the brake beam, and a depending loop adapted to receive the brake rod and prevent upward movement of the bracket out of engagement with the spring board.

2. The combination with a car truck including a brake beam and a spring board having an upwardly tapered flange, of a bracket having an inverted U-shaped portion defining a seating recess, the walls of which are disposed at an angle to each other for wedging engagement with the tapered flange of the spring board, said bracket being provided with a laterally projecting arm, the upper face of which is convex transversely and extends beneath the brake beam.

3. A safety device for car trucks comprising an upstanding inverted U-shaped body portion, a flange extending from one side of said body portion, an arm extending laterally from the other side of said body portion to engage under a brake beam, and a hanger depending from the arm and disposed in vertical alinement with one side of said body portion in position to engage about a brake rod and prevent upward movement of the device out of engagement with a spring board.

4. A safety device for car trucks comprising an upstanding inverted U-shaped body portion, one leg of which is straight and the other disposed at an angle thereto and terminates in an angularly disposed flange, a longitudinally tapered arm projecting laterally from the straight leg and having its upper surface transversely curved and provided with a terminal upstanding retaining lip, and a loop depending from the straight leg of the body portion and disposed in vertical alinement therewith for engaging about a brake rod and preventing upward movement of the body out of engagement with a spring board.

5. A safety device for car trucks comprising an upstanding inverted U-shaped body portion having one leg thereof straight and disposed in a vertical plane and its other leg diverging downwardly therefrom and terminating in a laterally extending flange having an opening therein for the reception of a fastening device, a longitudinally tapered arm projecting laterally from the straight leg of the body the arm having a transversely concaved upper face and being provided with a terminal upstanding retaining lip, and a loop depending from and disposed in vertical alinement with the straight leg of the body for engaging about a brake rod and holding the device against upward movement.

RICHARD D. SMITH.